March 2, 1954 A. GAUDLITZ 2,671,189
SEMICONDUCTOR AMPLIFIER HAVING A RESILIENTLY ADJUSTABLY MOUNTED SEMICONDUCTOR
Filed Nov. 27, 1950
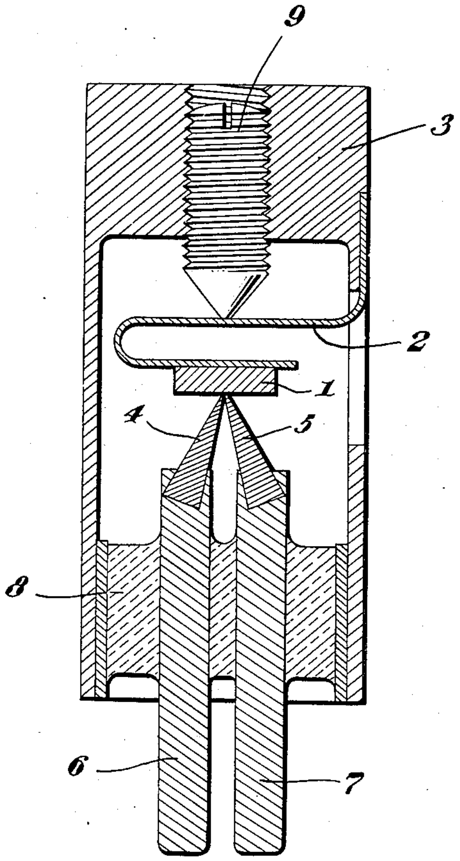
INVENTOR
Arthur Gaudlitz
BY
ATTORNEY Patented Mar. 2, 1954

2,671,189

UNITED STATES PATENT OFFICE 2,671,189

SEMICONDUCTOR AMPLIFIER HAVING A RESILIENTLY ADJUSTABLY MOUNTED SEMICONDUCTOR

Arthur Gaudlitz, Berlin, Germany, assignor to Siemens & Halske, Aktiengesellschaft, Munich, Germany, a corporation of Germany Application November 27, 1950, Serial No. 197,669

Claims priority, application Germany November 28, 1949

3 Claims. (Cl. 317—235)

This invention relates to semi-conductor amplifiers and is particularly concerned with a semi-conductor device having a resiliently adjustably mounted semi-conductor and a plurality of electrodes in point contact therewith. The object of the invention is to secure the positions of the point contacts by the provision of rigid electrode members forming such point contacts.

The electrodes in semi-conductor amplifiers or similar structures have been arranged heretofore in one of two principal ways. In one known arrangement, the electrodes, e. g., two pointed resilient Phosphor bronze wires or the like, also referred to as "whiskers," were placed slightly spaced from each other in point contact engagement with a previously suitably prepared germanium disk. In such structures there is danger of displacement of the resilient wires on the smooth disk surface, incident to the adjustment of the most favorable contact pressure, so that their spacing is either reduced to a point of touching or it is undesirably increased. It must be considered in this connection that the maintenance of a predetermined most favorable spacing between the contact points of the electrodes constitutes one of the critical requirements for the amplification effect. In order to obviate this danger of electrode displacement, the germanium disk in another known structure was ground hollow on either side, resulting in an extremely thin wafer. The electrode points were then placed upon the opposite sides of such wafer. The corresponding structure requires, aside from the special machining of the germanium disk, a careful placing of the electrode points so that they are positioned exactly in opposite relationship.

In order to obviate the above-noted difficulties, the invention proposes to mount the semi-conductor on a resilient springlike element which presses it against rigid electrode points disposed in predetermined spacing, the electrode points being of such rigidity that the spacing therebetween is not altered at the pressure required for the desired amplification effect.

Details of the invention will now be explained with reference to the accompanying drawing showing an embodiment of a semi-conductor device in diagrammatic sectional view and on a greatly enlarged scale.

Referring now to the drawing, the germanium semi-conductor 1 is suitably mounted, e. g., soldered, on one leg of a resilient generally S-shaped spring 2. The semi-conductor is finished as desired and is disposed within the casing 3 by securing thereon the other leg of the spring. Two electrodes 4, 5 forming contact points coact with the germanium semi-conductor. The two electrodes are formed of rigid, pointed triangular members which may be made, for example, of molybdenum, tungsten or Phosphor bronze, and their points are disposed in exactly the right spacing for the desired amplification effect. The two rigid electrode members 4, 5 are disposed in a common plane, so that the spacing between their points cannot be altered in the presence of the slight pressure required for the amplification effect. The members may be formed strong and rigid enough so that the relative positions of their points is in no way altered responsive to contacting the semi-conductor 1 and responsive to increase of pressure against the semi-conductor.

The pointing of the electrode members 4, 5 may be accomplished by grinding and subsequent electrolytic etching and polishing. Their fastening is obtained by securing them to the rigid supporting pins 6, 7 which are fixedly disposed in the insulating material 8.

The positioning of the germanium semi-conductor 1 against the points formed by the electrode members 4, 5 and the adjustment of the most favorable contact pressure is obtained by the actuation of a screw 9 which presses against the generally U-shaped carrier portion of the spring 2.

In the structure according to the invention, the positioning of the resilient holder 2 and therewith of the germanium semi-conductor 1 cannot be easily inadvertently altered, and the point spacing which is important for the amplification effect is maintained constant, so that the electrodes cannot be displaced relative to the semi-conductor surface even responsive to adjustment in operation in the presence of heat or vibrations. An added advantage resides in the possibility of carrying out the adjustment of the contact points outside of the casing, thereby easily obtaining the desired spacing.

The structure according to the invention is not inherently limited to specific use in amplifiers, and the term "amplifier," as used herein, is therefore intended to include any specific apparatus in which the inventions may be employed. The term semi-conductor is similarly intended to cover semi-conductors as such, regardless of the specific material thereof.

Changes may be made within the scope and spirit of the appended claims.

I claim:

1. A semi-conductor device comprising a pair of rigid pinlike supporting members, a rigid electrode carried by each supporting member which extends substantially axially therefrom at one end thereof, each electrode forming at its free end a rigid contact point, a tubular housing, means at one end of said housing for mounting said supporting members in insulated relationship with said rigid electrodes and associated rigid contact points thereof spaced from each other by a predetermined amount, a disklike semi-conductor, a resilient generally S-shaped spring for carrying said disklike semi-conductor on one of its legs, a recess in the wall of said housing for mounting the other leg of said spring to dispose one surface of said disklike semi-conductor in resilient pressure engagement with the contact points formed by said electrodes, the rigidity of said pinlike supporting members and said electrodes carried thereby being such that the predetermined spacing between said contact points is not affected by the pressure exerted thereon by said disklike semi-conductor responsive to pressure applied by said spring.

2. A semi-conductor device comprising a housing, a pair of rigid pinlike supporting members disposed at one end of said housing in insulated relation thereto and projecting thereinto, a cross-sectionally triangular rigid electrode carried by each pinlike supporting member at the free inner end thereof and projecting substantially axially therefrom, each of said electrodes forming at its free inner end a rigid contact point which is disposed in predetermined spacing from the rigid contact point formed by the other electrode, a generally S-shaped spring in said housing, said spring forming an inner arm and an intermediate arm extending substantially in parallel with said inner arm and a mounting leg extending at an angle from said intermediate arm, a recess formed in the wall of said housing for securing said mounting leg of said spring, a disklike semi-conductor carried by said inner arm of said spring and forming a surface for engagement with said rigid contact points of said rigid electrodes, and adjusting means projecting axially inwardly from the other end of said housing for exerting pressure on said intermediate arm of said spring to press said disklike semi-conductor on said inner arm against said rigid contact points of said electrodes, the rigidity of said electrodes and of said contact points formed thereby being such that the predetermined spacing between said contact points is not affected by the pressure exerted thereon by said disklike semi-conductor responsive to pressure applied by said adjusting means to said intermediate spring arm.

3. A semi-conductor device comprising a pair of rigid pinlike supporting members, a rigid electrode carried by each supporting member which extends rigidly therefrom in substantially axial direction at one end thereof, each electrode forming at its free end a rigid contact point, a tubular housing, means at one end of said housing for mounting said supporting members in insulated relationship with said rigid electrodes and associated rigid contact points thereof spaced from each other by a predetermined amount, a disklike semi-conductor, a resilient carrier member for carrying said disklike semi-conductor in engagement with one side thereof, means for mounting said resilient carrier member in engagement with the wall of said housing to dispose the surface of the other side of said disklike semi-conductor in resilient pressure engagement with the rigid contact points formed by said rigid electrodes, and adjusting means at the other end of said housing for coaction with said resilient carrier member to adjust the pressure engagement of the surface of said disklike semi-conductor relative to said rigid contact points, the rigidity of said pinlike supporting members and said electrodes extending rigidly therefrom being such that the predetermined spacing between said contacts is not affected by the pressure exerted thereon by said disklike semi-conductor responsive to pressure applied to said resilient carrier member by said adjusting means.

ARTHUR GAUDLITZ.

References Cited in the file of this patent

UNITED STATES PATENTS

| Number | Name | Date |
|---|---|---|
| 1,182,946 | Vosburgh | May 16, 1916 |
| 1,814,592 | Geiger | July 14, 1931 |
| 2,415,841 | Ohl | Feb. 18, 1947 |
| 2,429,823 | Kinman | Oct. 28, 1947 |
| 2,432,116 | McLean | Dec. 9, 1947 |
| 2,538,593 | Rose | Jan. 16, 1951 |